UNITED STATES PATENT OFFICE.

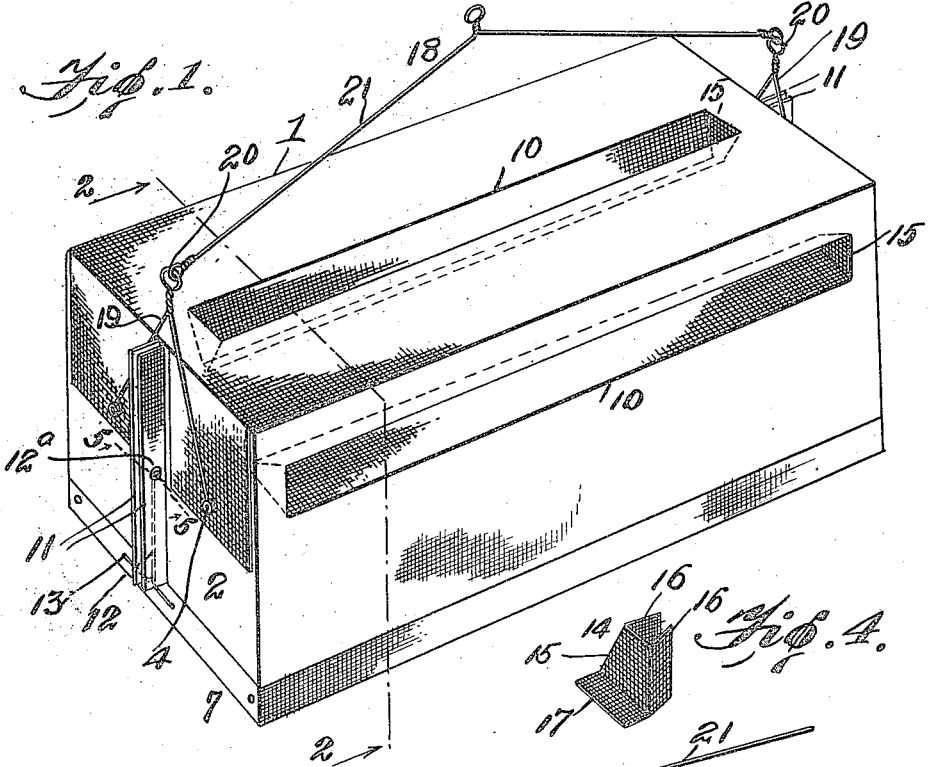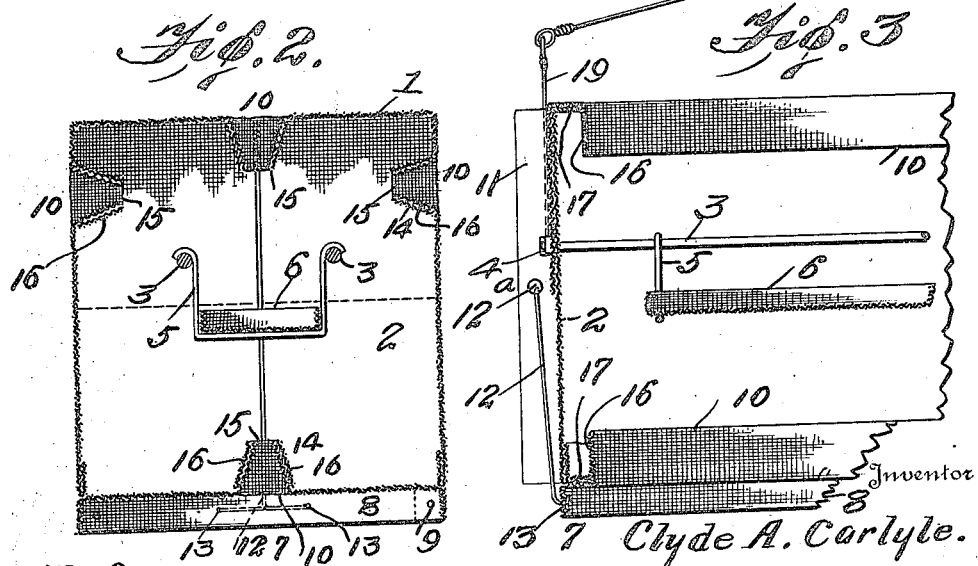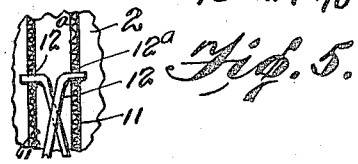

CLYDE A. CARLYLE, OF DETROIT, MICHIGAN, ASSIGNOR OF ONE-HALF TO BELLE D. CLEGHORN, OF RIVER ROUGE, MICHIGAN.

FLYTRAP.

1,424,619.  Specification of Letters Patent.  Patented Aug. 1, 1922.

Application filed August 13, 1921. Serial No. 492,055.

*To all whom it may concern:*

Be it known that I, CLYDE A. CARLYLE, a citizen of the United States, residing at Detroit, in the county of Wayne and State of Michigan, have invented certain new and useful Improvements in Flytraps, of which the following is a specification, reference being had therein to the accompanying drawings.

This invention relates to an insect trap, and more particularly to a fly trap.

The object of the invention is the construction of a simple and efficient trap which is comparatively inexpensive to manufacture, easy to clean, as well as to assemble after being separated for cleaning.

With the foregoing and other objects in view, my invention comprises certain novel combinations, constructions and arrangements of parts as will be hereinafter described, illustrated in the accompanying drawings, and more particularly pointed out in the appended claims.

In the drawings:

Figure 1 is a perspective view of a trap constructed in accordance with the present invention.

Figure 2 is a sectional view, taken on line 2—2, Fig. 1, and looking in the direction of the arrows.

Figure 3 is a fragmentary, longitudinal, sectional view of the trap.

Figure 4 is a perspective view of one of the end caps for the slots.

Figure 5 is a sectional view, taken on line 5—5, Fig. 1.

Referring to the drawings by numerals, 1 is the body formed of wire mesh; this body is preferably rectangular in shape. Supported upon the ends 2 of the body 1 are horizontal rods 3; these rods 3 are held in place by nuts 4.

Within the body 1, and suspended from rods 3, by hook frames 5, is a bait pan 6.

The bottom 7 comprises a rectangular frame 8 held together at the corners by rivets 9, and in the middle of the bottom 7 is a slot 10, whereby the insects may enter the trap. On the sides of the body 1 are formed slots 10 as well as in the top.

To each end 2 of the body 1 are fixedly secured, spaced, parallel, vertical strips 11 that brace and strengthen the body of the trap. Intermediate the ends of strips 11 are formed registering apertures 12ª (Fig. 3) and extending upward from the ends of the bottom 7 are supporting wires 12 which have their upper ends threaded through the apertures 12ª and these upper ends are bent at substantially right-angles, so as to just extend through the apertures 12ª (Fig. 1), which permit the bottom to be held against the body, yet when the operator wants to remove the body, all that is necessary is to press inwardly upon the upper ends of wires 12 and thereby allow the bottom to fall away from the body. In the preferred embodiment of my invention, illustrated in the drawing, the wires 12 are spread apart, (as shown in Fig. 1) at their bottoms, so that they are fastened or anchored to each end of the bottom 7 at two places or points 13; this fastening of the wires 12, at the bottom in two different places makes a better connection or support because of the strength of the attachment of the wires to the bottom. The placing of the wires 12 between the pairs of strips 11 protect the wires too, so that the bottom 7 will not be accidentally removed from the body 1 by reason of the wires being carelessly struck or hit.

Each slot 10 is formed conical in shape in cross section, by two pieces of wire mesh, and these two pieces of mesh are held together by end caps 14; each end cap comprises an end 15, sides 16 and a base 17. The sides 16 overlap the ends of the wire mesh pieces, constituting part of each slot, securely retaining the mesh pieces of the slot in position; therefore, it will be seen that each slot 10 is provided with a pair of end caps, each end comprises the substantially V-shaped body with a base, the body including the sides 16 and the end 15.

The trap may be suspended by the handle 18; this handle 18 comprises inverted, V-shaped ends 19 fastened at their lower ends to rods 3, and each end 19 is provided with an eye 20 through which extends the central portion 21 of handle 18.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a trap of the class described, the combination of a body and a bottom, said body and bottom each provided with a slot structure, each slot structure including a pair of end caps, each end cap comprising converging sides, a back integral with said sides, and a base integral with the back and sides.

2. In a trap of the class described, the combination of a body and a bottom, each provided with a slot structure, each slot structure including side-pieces, and end caps over the ends of said side-pieces.

3. In a trap of the class described, the combination of a body and a bottom, said body and bottom each provided with slot structures, each slot structure including end caps, each end cap provided with a V-shaped body and an integral base.

4. In a trap of the class described, the combination of a body, rods extending through said body, hook frames suspended from said rods, and a bait pan supported upon said hook frames.

5. In a trap of the class described, the combination of a body provided with rods, a handle including V-shaped ends, said ends connected to the ends of the rods, and a central portion connected to the upper ends of the V-shaped ends.

In testimony whereof I hereunto affix my signature.

CLYDE A. CARLYLE.